United States Patent
Verdino et al.

(10) Patent No.: US 10,248,597 B2
(45) Date of Patent: Apr. 2, 2019

(54) USB COMMUNICATION CONTROL MODULE, SECURITY SYSTEM, AND METHOD FOR SAME

(71) Applicant: RESPONSE TECHNOLOGIES, LTD., Harrison, OH (US)

(72) Inventors: Steven P. Verdino, Hamilton, OH (US); Andrew S. Morrison, Loveland, OH (US); Roy J. Cooley, West Chester, OH (US); Lawrence E. Wood, Chattanooga, TN (US)

(73) Assignee: Response Technologies, Ltd., Harrison, OH (US)

( * ) Notice: Subject to any disclaimer, the term of this patent is extended or adjusted under 35 U.S.C. 154(b) by 125 days.

(21) Appl. No.: 15/337,351

(22) Filed: Oct. 28, 2016

(65) Prior Publication Data
US 2017/0124011 A1   May 4, 2017

Related U.S. Application Data

(60) Provisional application No. 62/249,179, filed on Oct. 30, 2015.

(51) Int. Cl.
| | | |
|---|---|---|
| *G06F 13/38* | (2006.01) | |
| *G06F 13/42* | (2006.01) | |
| *G06F 1/26* | (2006.01) | |
| *H04L 5/16* | (2006.01) | |
| *H04W 4/10* | (2009.01) | |
| *H04W 4/12* | (2009.01) | |

(52) U.S. Cl.
CPC ............ *G06F 13/385* (2013.01); *G06F 1/266* (2013.01); *G06F 13/4282* (2013.01); *H04L 5/16* (2013.01); *H04W 4/10* (2013.01); *H04W 4/12* (2013.01)

(58) Field of Classification Search
CPC .................................................... G06F 13/385
See application file for complete search history.

(56) References Cited

U.S. PATENT DOCUMENTS

| | | |
|---|---|---|
| 6,647,452 B1 | 11/2003 | Sonoda |
| 6,735,720 B1 | 5/2004 | Dunn et al. |
| 6,738,834 B1 | 5/2004 | Williams et al. |
| 7,260,749 B2 | 8/2007 | Cox |
| 7,308,611 B2 | 12/2007 | Booth |
| 7,469,350 B2 * | 12/2008 | Henderson .......... G06F 11/0766 713/300 |
| 2003/0023843 A1 * | 1/2003 | Heath ....................... G06F 1/24 713/2 |
| 2005/0289257 A1 | 12/2005 | Fink |
| 2008/0201505 A1 | 8/2008 | Monroe |

* cited by examiner

*Primary Examiner* — Henry Tsai
*Assistant Examiner* — Juanito Borromeo
(74) *Attorney, Agent, or Firm* — Ulmer & Berne LLP

(57) ABSTRACT

A security system having a control unit in communication with detection devices and notification systems to provide messages. Methods for employing a control unit are also provided herein.

17 Claims, 3 Drawing Sheets

USB COMMUNICATION CONTROL MODULE, SECURITY SYSTEM, AND METHOD FOR SAME

REFERENCE TO RELATED APPLICATION

The present application claims priority of U.S. provisional application Ser. No. 62/249,179, filed Oct. 30, 2015, and hereby incorporates the same application herein by reference in its entirety.

TECHNICAL FIELD

A monitoring/alert device for a security system to monitor an environment and provide an alert upon receipt that a particular action has been detected.

BACKGROUND

Monitoring and alert systems have become important and necessary tools for business owners, government agencies, law enforcement, and residents to provide adequate security and offer a sense of safety. People have adopted many solutions to provide added security to protect assets, property, and themselves. As such, providing a security system which provides remote monitoring would be of great benefit to those seeking additional and/or alternative security options.

SUMMARY

In accordance with one embodiment, a USB communication control module comprises a first USB port, a first port power controller, a USB switch, and a microprocessor. The first USB port comprises an input power port and is configured for electrical coupling and data communication with an associated USB device. The first port power controller is in communication with the input power port of the first USB port. The first port power controller is operable in one of a power delivery mode and a power interrupt mode. When in the power delivery mode, the first port power controller facilitates delivery of power from a power source to the input power port of the first USB port. When in the power interrupt mode, the first port power controller facilitates the interruption of power from the power source to the input power port of the first USB port. The USB switch is in data communication with the first USB port via a first communication bus and in control communication with the first port power controller via a first control bus. The microprocessor is in data communication with the USB switch via a second communication bus. Data communicated between the microprocessor and a USB device is routed over the first communication bus, through the USB switch, over the second communication bus, and through the first USB port. The USB switch monitors the first communication bus to determine whether communication between the first USB port and the associated USB device is lost. When communication between the first USB port and the associated USB device is lost, the USB switch facilitates temporary operation of the first port power controller in the power interrupt mode via the first control bus to restart the first USB port.

In accordance with another embodiment, a security system comprises a first associated USB device and a control unit. The first associated USB device is configured to selectively transmit a data message. The control unit comprises a USB communication control module that comprises a first UBS port, a first port power controller, a USB switch, and a microprocessor. The first USB port comprises an input power port and is electrically coupled and in data communication with the first associated USB device. The first port power controller is in communication with the input power port of the first USB port. The first port power controller is operable in one of a power delivery mode and a power interrupt mode. When in the power delivery mode, the first port power controller facilitates delivery of power from a power source to the input power port of the first USB port. When in the power interrupt mode, the first port power controller facilitates the interruption of power from the power source to the input power port of the first USB port. The USB switch is in data communication with the first USB port via a first communication bus and in control communication with the first port power controller via a first control bus. The microprocessor is in data communication with the first USB port via a second communication bus. Data communicated between the microprocessor and the first associated USB device is routed over the first communication bus, through the USB switch, over the second communication bus, and through the first USB port. The USB switch monitors the first communication bus to determine whether communication between the first USB port and the first associated USB device is lost. When communication between the first USB port and the first associated USB device is lost, the USB switch facilitates temporary operation of the first port power controller in the power interrupt mode via the first control bus to restart the first USB port.

In accordance with another embodiment, a method of operating a USB communication control module is provided. The USB communication control module comprises a USB switch in data communication with a USB port, and a port power controller in electrical communication with the USB port. The method comprises operating, by the USB switch, the port power controller in a power delivery mode to facilitate delivery of power from a power source to the USB and monitoring, by the USB switch, data communication between the USB port and an associated USB device that is electrically coupled and in communication with the USB port. The method further comprises, when data communication between the USB port and the associated USB device is lost, temporarily operating, by the USB switch, the port power controller in a power interrupt mode to facilitate interruption of power from a power source to the USB port to restart the USB port.

BRIEF DESCRIPTION OF THE DRAWINGS

It is believed that certain embodiments will be better understood from the following description taken in conjunction with the accompanying drawings in which.

DETAILED DESCRIPTION

Selected embodiments are hereinafter described in detail in connection with the views and examples of FIGS. 1-3. Security systems have become important and necessary tools for business owners and residents to provide adequate security and offer a sense of safety. Multiple solutions have been adopted to provide added security to protect assets, property and people. Such security systems can be employed in homes, schools, medical facilities, courthouses, retail locations, warehouses, industrial sites, casinos, or any other suitable location. However, there remains a need to have a monitoring system which provides sufficient flexibility to monitor and protect such locations with remote capabilities and simple ease of use.

Figure 1:
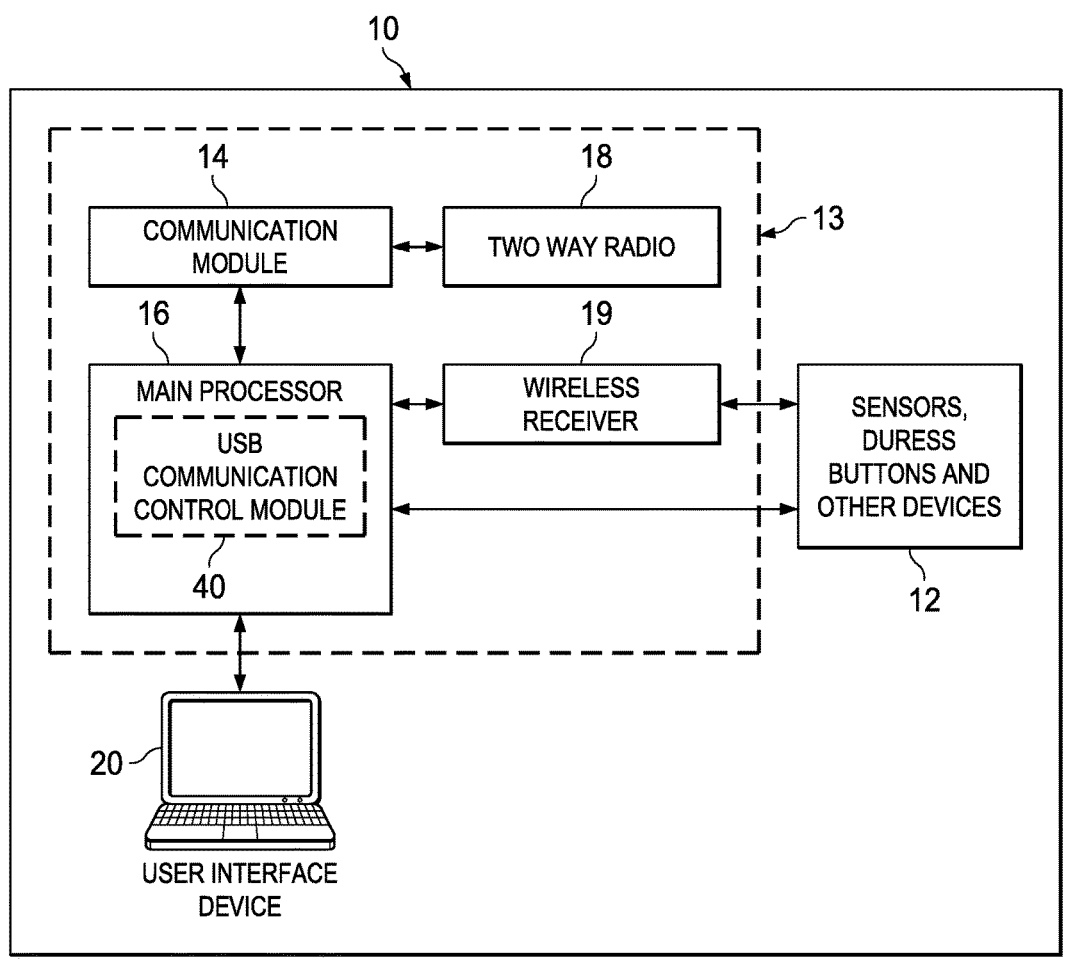
FIG. 1 is a schematic view depicting a general representation of a security system.

A security system 10 in accordance with one embodiment is generally depicted in FIG. 1. The security system 10 can include one or more detection devices 12 (e.g., sensors) and a control unit 13. The control unit 13 can include a communication module 14 and a main processor module 16. The main processor module 16 can be in communication with the one or more detection devices 12 which can communicate with the communication module 14 via the main processor module 16. The communication module 14 can also be in communication with a two-way radio 18 or other audio device (e.g., speakers, PA systems, etc.) to facilitate remote communication with the control unit 13. In one embodiment, the two-way radio 18 can comprise a half-duplex radio configured to operate exclusively in one of a voice reception mode and a transmit mode. In such an embodiment, when in the voice reception mode, the half-duplex radio receives a voice signal from a remote half-duplex radio and when in the transmit mode the half-duplex radio transmits an outgoing audio signal to a remote half-duplex radio. The half-duplex radio can be a push-to-talk (PTT) radio, voice activated, or any of a variety of other suitable communication devices that communicate exclusively in one of a voice reception mode and a transmit mode.

Each of the detection devices 12 and the control unit 13 can cooperate to observe and protect an environment (e.g., home, church, warehouse, store, etc.). As generally depicted in FIG. 1, the main processor module 16 of the control unit 13 can be in communication with the one or more detection devices 12 to determine if such detection devices 12 are activated. If one or more of the detection devices 12 are activated, the main processor module 16 can dispatch a message to the communication module 14 when the activated detection device 12 requires audio/radio communication from the two-way radio 18. For example, a detection device 12 can comprise a duress button, which, when activated by a user, transmits a message to the main processor module 16 indicating that it has been activated. The main processor module 16 can recognize the activation of the duress button as requiring audio/radio communication and can dispatch the message to the communication module 14 for transmission from the two-way radio 18. It will be appreciated that a number of different types of detection devices can be employed as part of a security and alert system. For example, such detection devices can include motion sensors, car counters, door/window transmitters, glass break detection transmitters, motion activated digital cameras, tilt switches, motion detectors, pressure mats, smoke detector transmitters, temperature transmitters, trip beams, universal transmitters, water detection devices, and any other suitable detection devices or combination thereof. Because a security and alert system as described herein can incorporate a variety of detection devices, in both type and number, this provides added flexibility to the user relying on the security system for protection. For example, if a business owner wants to continuously monitor various locations within a particular environment, like a store, a security system could utilize different types of detection devices located at various locations (e.g., at each door and each window), which can then all be tied to and be in communication with a single monitoring device.

The detection devices 12 can communicate with the main processor module 16 in a number of suitable ways. In certain embodiments, such communication can occur wirelessly via a wireless receiver 19 with the main processor module 16 (e.g., via radio communication, Wi-Fi, or the like). As such, a main processor module 16 can communicate with the detection devices 12 in a wireless environment allowing for the detection devices 12 to be portable, thus providing flexibility to the user to place the detection devices 12 in any number of a variety of locations within an environment. The main processor module 16 can additionally or alternatively communicate with the detection devices 12 via wired communication (e.g., via a LAN, WLAN, Internet, USB, or RJ45 connection). In one embodiment, as illustrated in FIG. 3 and discussed further below, the main processor module 16 can include a USB communication control module 40 that facilitates wired communication with the detection devices 12.

As generally depicted in FIG. 1, once the main processor module 16 receives a communication from the one or more detection devices 12 indicating activation of a particular detection device 12, the communication module 14 can then transmit an audio message using the two-way radio 18. The main processor module 16 can additionally, or alternatively, send a message and/or alert (e.g., an email) to the appropriate device (e.g., cellular phone, pager, or the like). In some embodiments, such communication between the communication module 14 and the two-way radio 18 can occur in a wired environment (e.g., via USB). It will be appreciated that, although a two-way radio is described and shown, any number of suitable alternative or additional types of notification devices can be employed as part of the security or monitoring system described herein. For example, notification devices can include phones (landline or mobile), pagers, and any other suitable voice/audio/text capable devices. Messages provided to such notification devices can take the form of alarms, calls, emails, pages, and any other suitable voice, audio and/or textual message. For example, a message could broadcast to a police officer's two-way radio and repeat the phrase, "BREAK-IN OCCURRING AT 123 APPLESEED DRIVE, RESPOND IMMEDIATELY." It is contemplated that a message sent to a notification device can be received by the notification device during a short time interval. For example, in certain embodiments a notification device can receive the message in less than about 5 seconds; in certain embodiments in less than about 3 seconds; and in certain embodiments in less than about 1 second. It is also contemplated that such messages or alerts can be broadcast over multiple channels or frequencies and/or can be repeated in regular intervals, so as to insure receipt of the message.

The communication module 14 generally depicted in FIG. 1 can be configured to have any number of configurations that receive the messages from the detection devices 12 and can facilitate transmission of an appropriate audio message over the two-way radio 18 (i.e., to send an alert). The communication module 14 can also receive audio from the two-way radio 18 which can be played locally, sent to another device on the network, or connected to a system to facilitate playback, storage, or the like.

The communication module 14 can be configured to control various parameters of the two-way radio 18 such as power, audio bias, squelch, or clear channel delay, for example, to enable the two-way radio 18 to be used as an audio link for communication with remote devices (e.g., a remote command/control center). It is to be appreciated that any of a variety of different off-the-shelf two-way radios can be retrofit to the control unit 13 for use as the audio link. To retrofit an off-the-shelf two-way radio, an internal communication module (e.g., provided from manufacturer) (not shown) can be removed and replaced with a customized module. The customized module can be communicatively coupled with the communication module 14 and can be configured to interact with the internal circuitry of the two-way radio 18 to allow the two-way radio 18 to be controlled by the communication module 14. The customized module can be powered from the communication module 14. It will be appreciated that the customized module can be designed to interact with any of a variety of different off-the-shelf two-way radios.

The main processor module 16 can be communicatively coupled with the communication module 14 to allow for programming of the communication module 14 to effectively communicate with the two-way radio 18. The communicative coupling can be in addition to, or the same as, the communicative coupling that facilitates the transmission of messages from the main processor module 16 to the communication module 14 when a detection device 12 is activated. The main processor module 16 can include an on-system webserver or other software (not shown) that can facilitate control of the two-way radio 18 from the communication module 14. In particular, the on-system webserver can facilitate automated control of various transmission functions of the two-way radio 18 such as, for example, power, audio bias, squelch, and clear channel delay. The parameters for these various functions can be selected (e.g., by a user) to enable the two-way radio 18 for use in a particular environment and/or based upon the particular model/type of two-way radio being used.

The communication module 14 can also be communicatively coupled with a speaker/microphone connection (not shown) on the two-way radio 18. Using this connection, the communication module 14 can be configured to monitor for radio traffic from other radio frequency (RF) devices on the same channel and prevent the two-way radio 18 from transmitting a message at the same time (e.g., "talking over") as the other device. In one embodiment, the communication module 14 can monitor the signal level of the speaker/microphone connection to determine if another device is occupying the channel.

In one embodiment, as illustrated in FIG. 1, a user-interface device 20 can be connected (wired via a LAN, WLAN, Internet, USB, or RJ45, for example, or wirelessly via Wi-Fi, for example) to the main processor module 16 to facilitate configuration of the settings of the two-way radio 18. The user-interface device 20 can be a general purpose computer (e.g., computer, laptop, tablet, server, etc.) or any of a variety of other suitable computing devices. Once the user-interface device 20 is connected, a user can configure various parameters of the two-way radio 18. The main processor module 16 and the user-interface device 20 can accordingly cooperate to allow for remote setup and configuration of the control unit 13 to support any of a variety of security strategies. The communication module 14 thus offers a flexible, remotely reconfigurable radio interface which supports a wide variety of radios by configuring the settings and/or making adjustments over the web interface.

The communication module 14 and the two-way radio 18 can cooperate to provide an audio link that allows the control unit 13 to communicate with other devices (e.g., a central monitoring station). The communication module 14 can include a variety of features to encourage reliable operation, such as, for example, run-time tracking, measurements of voltage and currents being supplied to the radio, and monitoring of received radio traffic. Some examples of how monitoring of the received traffic can be used include detecting that a channel has been clear long enough that an attempt may be made to deliver a message, determining whether a communication fault exists when no radio traffic has been received after a predetermined time, and detecting a BONK condition (where the access to the transmission channel is not present or has been lost) so the message may be delayed and delivered later. The communication module 14 can also enforce a maximum transmission duration to prevent a radio channel from being occupied for an excessive amount of time.

Figure 2:
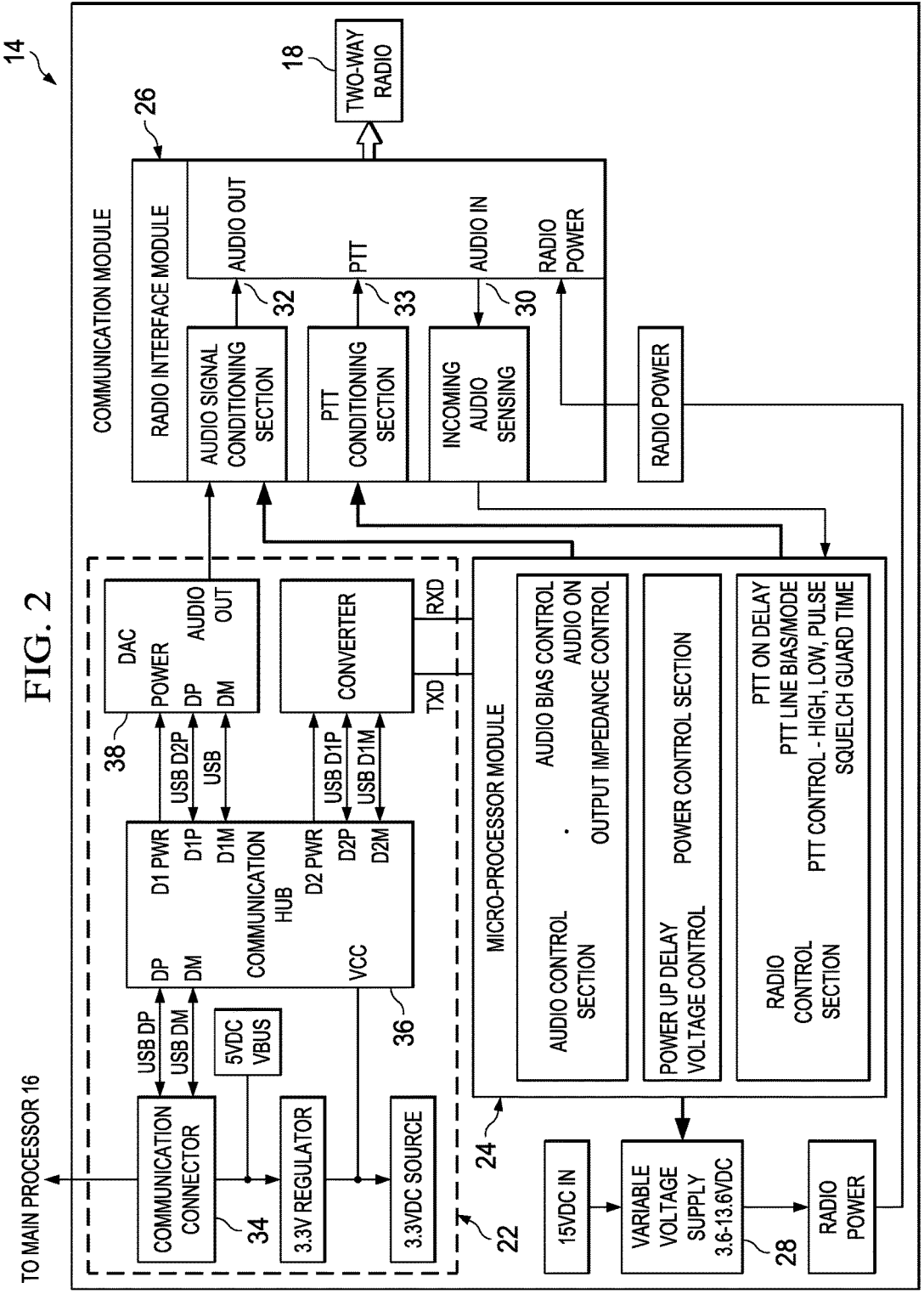
FIG. 2 is a schematic view depicting a communication module of the security system of FIG. 1.

Referring now to FIG. 2, the communication module 14 can include a signal routing module 22, a microprocessor module 24 in communication with the signal routing module 22, and a radio interface module 26 in communication with the microprocessor module 24. The radio interface module 26 can interface with a communication port of the two-way radio 18. In one embodiment, a radio power portion of the radio interface module 26 can be inserted into the battery compartment of the two-way radio 18 (in lieu of a separate rechargeable battery) to interface with the communication port and power the two-way radio 18. In such an embodiment, a variable voltage supply 28 can provide power to the radio interface module 26 for powering of the two-way radio 18. In one embodiment, the variable voltage supply 28 can be substantially infinitely variable, preferably between about 3 VDC and about 14 VDC.

The radio interface module 26 can be configured to receive a voice signal from the two-way radio 18 and can be configured to transmit an outgoing audio signal to the two-way radio 18. More particularly, the two-way radio 18 can receive voice messages from remote two-way radios (in the form of the voice signal) which are transmitted to an audio-in port 30 of the radio interface module 26. The two-way radio 18 can also transmit voice messages to remote two-way radios (in the form of an outgoing audio signal) which are transmitted from an audio-out port 32 of the radio interface module 26. The radio interface module 26 can also include a PTT port 33 that facilitates selective operation of the two-way radio 18 in one of the voice reception mode and the transmit mode.

Still referring to FIG. 2, the signal routing module 22 can include a communication connector 34, a communication hub 36, and a digital to audio converter (DAC) 38. In one embodiment, the communication connector 34, the communication hub 36, and the DAC 38 can each be USB devices configured to be powered and to communicate among each other via the USB protocol. In other embodiments, the communication connector 34, the communication hub 36, and the DAC 38 can be configured to communicate via any of a variety communication protocols.

The transmission of an outgoing audio message from the control unit 13 will now be discussed. The signal routing module 22 can be in communication with the main processor module 16 via the communication connector 34 and can be configured to receive a control signal and an outgoing audio signal from the main processor module 16. For example, when any of the detection devices 12 detect an alarm condition, the detection devices 12 can transmit an alarm signal to the main processor module 16. In response to the alarm signal, the main processor module 16 can generate a control signal and the outgoing audio signal. The control signal can include information that facilitates control of the how and/or when the outgoing audio signal is to be transmitted from the two-way radio 18, such as, for example, PTT activation delay, PTT line bias/mode, PTT control (high, low, pulse), squelch guard time, audio bias control, or output impedance control. The outgoing audio signal can include the audio message (e.g., a pre-recorded or computer generated message) that is to be broadcast from the two-way radio 18 to a remote two-way radio indicating the alarm conditions detected by the detection devices 12.

The signal routing module 22 can transmit the outgoing audio signal to the radio interface module 26 via the DAC 38 and can transmit the control signal to the microprocessor module 24. The microprocessor module 24 can monitor (e.g., listen to) the audio-in port 30 of the radio interface module 26 to determine whether the two-way radio 18 is receiving any voice messages from remote two-way radios (e.g., to avoid collisions). When the two-way radio 18 is not receiving any voice messages, the microprocessor module 24 can activate the PTT port 33 (to place the two-way radio 18 in the transmit mode) in accordance with the PTT characteristics from the control signal (e.g., PTT activation delay, PTT line bias/mode, PTT control (high, low, pulse), or squelch guard time) to facilitate transmission of the outgoing audio signal through the radio interface module 26 and from the two-way radio 18 and to remote two-way radio(s). The microprocessor module 24 can control the characteristics of the outgoing audio signal (e.g., the audio bias control or output impedance control) based upon the control parameters from the control signal. It is to be appreciated that the outgoing audio message can be received and audibly played by remote two-way radios to indicate the alarm conditions detected by the detection devices 12.

The reception of an audio message (e.g., an audio signal) at the control unit 13 from a remote two-way radio will now be discussed. When an alarm condition is detected at a remote location, the remote two-way radio can transmit an audio message indicating the nature of the alarm to the control unit 13. In some instances, the audio message can be generated by a user who has witnessed the alarm condition and audibly reports (e.g., speaks) the condition into his/her remote two-way radio. In other instances, the audio message can be generated by a remote security system (e.g., 10) that sends an automated audio message (e.g., computer generated speech) describing the nature of the alarm detected by remote detection devices (e.g., 12). In either instance, the audio message can be transmitted to the two-way radio 18 and transmitted to the audio-in port 30 of the radio interface module 26. The audio message can then be transmitted to the microprocessor module 24.

The microprocessor module 24 can be configured to translate the audio message into text data. In one embodiment, the microprocessor module 24 can include voice recognition software that facilitates conversion of the audio message into text data. Once the audio message has been converted into text data, the text data can be transmitted through the signal routing module 22 and to the main processor module 16. The main processor module 16 can then transmit the text data to the user interface device 20 to notify a user of the alarm condition(s). In one embodiment, the text data can comprise a text message and the user interface device 20 can comprise a mobile computing device (e.g., a mobile phone).

It is to be appreciated that, as described above, the two-way radios (e.g., 18) can be half-duplex radios that have a limited communication range (e.g., a square mile) as compared to cellular networks. As such, a network of security systems (e.g., 10), as described herein, can be confined to a localized area, such as a school/business campus or office building. The use of half-duplex radios in these environments can be more cost effective and less time consuming to implement than other security systems. For example, by using half-duplex radios, a user can avoid subscription costs oftentimes associated with larger (e.g., cellular) communications networks. In addition, a security system (e.g., 10) can be added or removed to/from a particular network without assistance from a third party host (such as a cellular provider).

Figure 3:
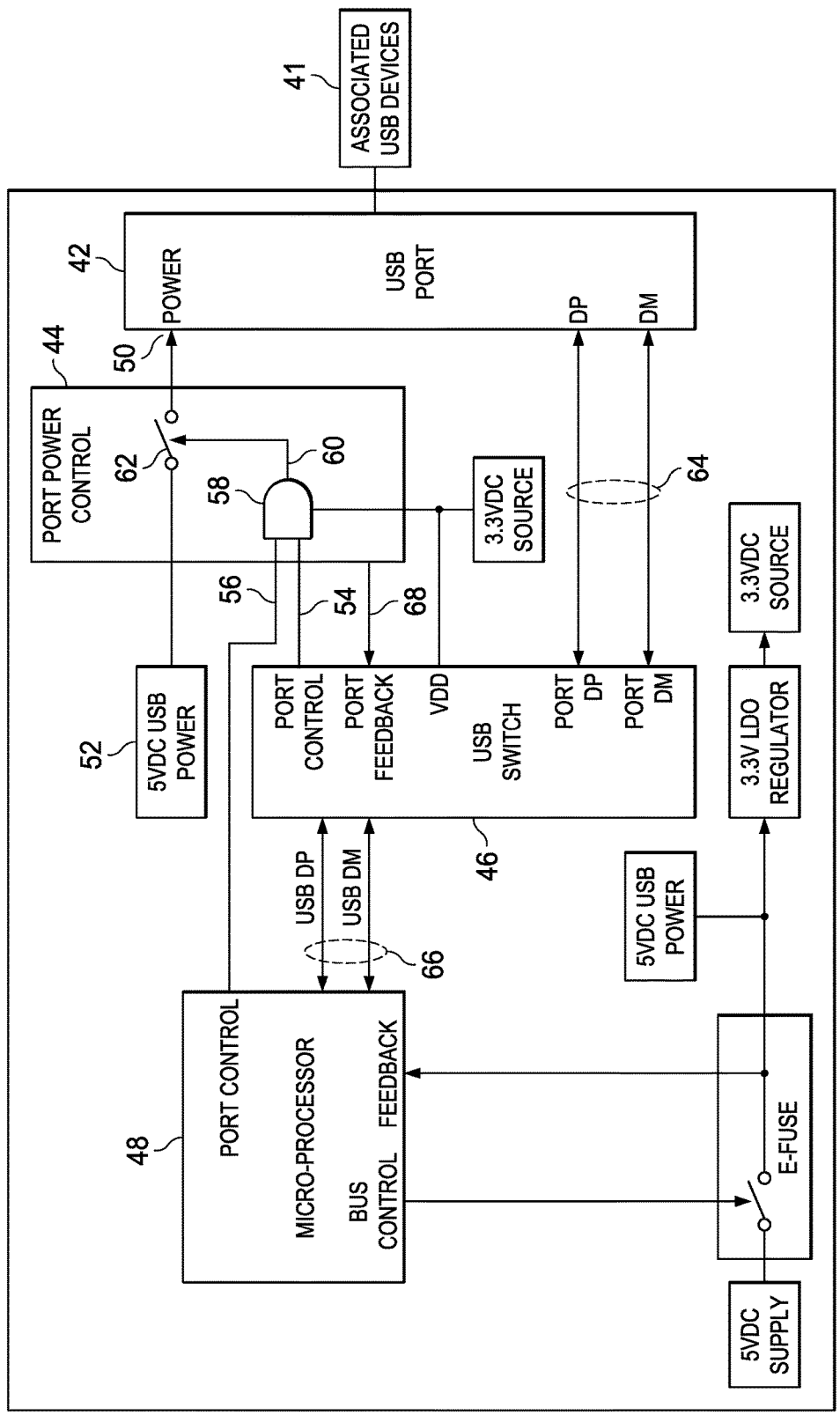
FIG. 3 is a schematic view depicting a USB communication control module of the security system of FIG. 1.

Referring now to FIG. 3, the main processor module 16 can include the USB communication control module 40 that facilitates wired communication with various USB devices 41 (e.g., associated USB devices) such as, for example, the communication module 14, the wireless receiver 19, relays, and, in some cases, the detection devices 12. It is to be appreciated that the USB devices attached to the communication control module 40 can be any of a variety of wired devices that are powered by, and communicate via, a USB connection. The USB communication control module 40 can include a USB port 42, a port power controller 44, a USB switch 46, and a microprocessor module 48. The USB port 42 can be in electrical communication and data communication with at least one of the associated USB devices 41 via a USB cable (not show). The USB port 42 can include an input power port 50 that receives power for powering the wired version of detection devices 12 or other USB devices.

The port power controller 44 can be in communication with the input power port 50 and can be coupled with a power source 52. The port power controller 44 can be operable in one of a power delivery mode and a power interrupt mode. When the port power controller 44 is in the power delivery mode, it can facilitate delivery of power from the power source 52 to the input power port 50 of the USB port 42 to power the associated USB device(s) 41 that is/are coupled with the USB port 42 (e.g., the associated USB device(s) 41). When the port power controller 44 is in the power interrupt mode, it can facilitate interruption of the power from the power source 52 to the input power port 50 to power down the USB port 42 and the associated USB device(s) 41.

Each of the USB switch 46 and the microprocessor module 48 can be in control communication with the port power controller 44 via respective control communication busses 54, 56. Each of the USB switch 46 and the microprocessor module 48 can control operation of the port power controller 44 in either of the power delivery mode or the power interrupt mode via the control communication busses 54, 56. In one embodiment, the input power port 50 can include an AND gate 58 to which the control communication busses 54, 56 are inputs. An output 60 of the AND gate 58 can be in communication with a switch 62 that can be selectively opened (as shown in FIG. 3) or closed (not shown) to connect and disconnect, respectively, the power source 52 to the USB port 42 in response to the output 60.

Each of the USB switch 46 and the microprocessor module 48 can request operation of the port power controller 44 in the power delivery mode by imparting a signal (e.g., a high voltage condition or logical 1) to the respective control communication busses 54, 56. Conversely, each of the USB switch 46 and the microprocessor module 48 can request operation of the port power controller 44 in the power interruption mode by inhibiting transmission of a signal (e.g., a low voltage condition or logical 0) to the respective control communication busses 54, 56. When both the USB switch 46 and the microprocessor module 48 request operation of the port power controller 44 in the power delivery mode, a signal (e.g., a high voltage condition or logical 1) can be imparted to the output 60 of the AND gate 58 which can close the switch 62 to connect the power source 52 to the USB port 42 thereby operating the port power controller 44 in the power delivery mode. However, when either the USB switch 46 or the microprocessor module 48 request operation of the port power controller 44 in the power interrupt mode, transmission of a signal can be inhibited (e.g., a low voltage condition or logical 0) on the output 60 of the AND gate 58 which can open the switch 62 to disconnect the power source 52 to the USB port 42 thereby operating the port power controller 44 in the power interrupt mode. It is to be appreciated that the port power controller 44 can include any of a variety of suitable additional or alternative logic arrangements that facilitate control of the operating mode of the port power controller 44 from the USB switch 46 and the microprocessor module 48.

Still referring to FIG. 3, the USB switch 46 can be in data communication with the USB port 42 via a first communication bus 64 and the microprocessor module 48 can be in data communication with the USB switch 46 via a second communication bus 66. Data communicated between the microprocessor module 48 and an associated USB device 41 can be routed over the first communication bus 64, through the USB switch 46, over the second communication bus 66, and through the USB port 42 to the associated USB device (s) 41. For example, a message originating at one of the associated USB device(s) 41 can be transmitted through the USB port 42, routed over the first communication bus 64, through the USB switch 46, over the second communication bus 66, and to the microprocessor module 48 for distribution therefrom (e.g., to the communication module 14 and/or the user interface device 20). Conversely, a message originating at the microprocessor module 48 (e.g., from the communication module 14 and/or the user interface device 20) can be routed over the second communication bus 66, through the USB switch 46, over the first communication bus 64, through the USB port 42, and to at least one of the associated USB devices 41. Although the first and second communication busses 64, 66 are described as being bidirectional busses, in some embodiments, the first communication bus 64 and/or the second communication bus 66 can be a unidirectional bus.

The USB switch 46 and the microprocessor module 48 can cooperate to detect malfunctioning of the associated USB device(s) 41 on the USB switch 46 and restart the associated USB device(s) 41 to try and restore proper operation. In one embodiment, the USB switch 46 can monitor the first communication bus 64 (e.g., via internal logic) to determine whether communication between the USB port 42 and the associated USB device(s) 41 has been lost. When communication between the USB port 42 and the associated USB device(s) 41 has been lost, the USB switch 46 can facilitate temporary operation of the port power controller 44 in the power interrupt mode to restart the failed USB port 42. For example, when communication between the USB port 42 and the associated USB device(s) 41 has been lost, the USB switch 46 can inhibit transmission of the enable signal (e.g., change the high voltage signal to a low voltage signal or change the logical 1 to a logical 0) on the control communication bus 54 which can open the switch 62, thereby powering down the USB port 42 and the associated USB device(s) 41. Soon thereafter (e.g., within between about 500 mS and 5 seconds), the USB switch 46 can reinitiate transmission of the enable signal (e.g., change the low voltage signal to a high voltage signal or change the logical 0 to a logical 1) on the control communication bus 54 which can close the switch 62 (as long as the microprocessor module 48 is still transmitting an enable signal on the control communication bus 56), thereby restarting the USB port 42 and the associated USB device(s) 41.

Additionally or alternatively, the microprocessor module 48 can monitor the second communication bus 66 (e.g., via internal logic) to determine whether communication between the microprocessor module 48 and the associated USB device(s) 41 has been lost. When communication between the microprocessor module 48 and the associated USB device(s) 41 has been lost, the microprocessor module 48 can facilitate temporary operation of the port power controller 44 in the power interrupt mode to restart the failed USB port 42. For example, when communication between the microprocessor module 48 and the associated USB device(s) 41 has been lost, the microprocessor module 48 can inhibit transmission of the enable signal (e.g., change the high voltage signal to a low voltage signal or change the logical 1 to a logical 0) on the control communication bus 56 which can open the switch 62, thereby powering down the USB port 42 and the associated USB device(s) 41. Soon thereafter (e.g., within between about 500 mS and 5 seconds), the microprocessor module 48 can reinitiate transmission of the enable signal (e.g., change the low voltage signal to a high voltage signal or change the logical 0 to a logical 1) on the control communication bus 56 which can close the switch 62 (as long as the USB switch 46 is still transmitting an enable signal on the control communication bus 54), thereby restarting the USB port 42 and the associated USB device(s) 41. It is to be appreciated that, in some embodiments, the first and second communication busses 64, 66 can be industry standard USB communications lines that enable USB communication. The USB switch 46 and the microprocessor module 48 can include internal logic (not shown) that monitors the respective first and second communication busses 64, 66 for lost communication (e.g., weak communication signal, disconnected USB cable, data errors, or the like).

In another embodiment, the USB switch 46 can monitor the delivery of power to the associated the microprocessor module 48, and, when an abnormal power condition exists at the associated USB device(s) 41, can facilitate temporary operation of the port power controller 44 in the power interrupt mode to restart the USB port 42. For example, as illustrated in FIG. 3, the USB switch 46 can be in data communication with the port power controller 44 via a feedback bus 68 which provides feedback data to the USB switch 46. The feedback data can indicate whether an abnormal power condition exists at the associated USB device(s) 41 (e.g., low received power or no power). When the feedback data indicates that an abnormal power condition exists, the USB switch 46 can facilitate temporary operation of the port power controller 44 in the power interrupt mode, as described above, to restart the USB port 42 and the associated USB device(s) 41.

It is to be appreciated that, although the USB communication control module 40 is shown with an individual USB port 42, in some embodiments, the USB communication control module 40 can include a plurality of USB ports (collectively referred to as a "USB hub"). In one embodiment, the USB hub can include 7 USB ports (e.g., 42). The USB port 42 shown in FIG. 3 and described above can be understood to be representative of these additional USB ports. For example, each USB port (e.g., 42) can be associated with a dedicated port power controller (e.g., 44) and a dedicated communication bus (e.g., 64). The USB switch 46 and the microprocessor module 48 can be in control communication with each of the dedicated port power controllers (e.g., 44) via respective control communication busses (e.g., 54, 56). The USB switch 46 can also be in data communication with each dedicated port power controller (e.g., 44) via a dedicated feedback bus (e.g., 68).

Each of the USB ports can have a unique address which can facilitate effective communication between the microprocessor module 48 and the various USB ports (e.g., 42). For example, messages sent by the microprocessor module 48 to the USB switch 46 can be routed to the appropriate USB port (e.g., 42) and the associated USB device 41 based upon the unique addresses. These unique addresses can also facilitate in the restarting of the appropriate USB port (e.g., 42) when communication is lost or an abnormal power condition occurs. For example, when an associated USB device(s) 41 has lost communication or is experiencing an abnormal power condition, the USB port (e.g., 42) coupled with that associated USB device 41 can be identified by its unique address. The USB switch 46 or the microprocessor module 48 can then restart that USB port (e.g., 42) (via the respective control communication busses (e.g., 54, 56)) and the associated USB device(s) 41 to restore proper operation of the associated USB device(s) 41.

In such an embodiment, if restarting the individual USB port (e.g., 42) does not restore proper operation of the associated USB device(s) 41, the USB switch 46 or the microprocessor module 48 can then restart the entire USB hub (e.g., all of the USB ports (e.g., 42)). If restarting the individual USB hub does not restore proper operation of the associated USB device(s) 41, the microprocessor module 48 can then send a message to a user (e.g., via the user interface device 20) that indicates that further action should be taken.

The USB communication device 40 can, therefore, allow for selective restarting of an individual addressable USB port and/or USB hub to restore communication with an associated detection device that has experienced abnormal communication or power conditions more effectively than certain conventional arrangements.

It is to be appreciated that, although the USB communication control module 40 is shown to be included as part of the main processor module 16, it is contemplated that the USB communication control module 40 can be a stand-alone component that is physically separate from the main processor module 16. It is also to be appreciated that while the USB communication module 40 is described as part of a security system, the USB communication module 40 can be part of any computing system utilizing communication via a USB communication platform.

In one embodiment, a console unit (not shown) can house the control unit 13. In one embodiment, the console unit can comprise a Pelican™ case. Such casing can provide additional protection and support to the control unit 13, preventing damage or accidental activation/deactivation of the control unit 13. For example, a control unit may be stored and locked in the casing during transport and/or use. For ease of transport, such a casing can include a handle or any other suitable arrangement to permit easy transport of a control unit. Furthermore, such a casing may have requisite openings to permit cables or cords (e.g., power cords) to pass through the casing and connect to a monitoring device. In certain embodiments, a casing can be integral or independent of a console unit. It will also be appreciated that such casings may have various shapes, styles, and configurations as may be suitable to provide flexibility to the use of a monitoring device.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A USB communication control module comprising:
a first USB port that comprises an input power port and is configured for electrical coupling and data communication with an associated USB device;
a first port power controller in communication with the input power port of the first USB port, the first port power controller being operable in one of a power delivery mode and a power interrupt mode, wherein when in the power delivery mode, the first port power controller facilitates delivery of power from a power source to the input power port of the first USB port, and when in the power interrupt mode, the first port power controller facilitates the interruption of power from the power source to the input power port of the first USB port;
a USB switch in data communication with the first USB port via a first communication bus and in control communication with the first port power controller via a first control bus;
a microprocessor in data communication with the USB switch via a second communication bus; wherein:
data communicated between the microprocessor and a USB device is routed over the first communication bus, through the USB switch, over the second communication bus, and through the first USB port;
the USB switch monitors the first communication bus to determine whether communication between the first USB port and the associated USB device is lost;
when communication between the first USB port and the associated USB device is lost, the USB switch facilitates temporary operation of the first port power controller in the power interrupt mode via the first control bus to restart the first USB port; and
the USB switch monitors the delivery of power from the power source to the input power port of the first USB port, and, when abnormal power conditions exist, facilitates temporary operation of the first port power controller in the power interrupt mode to restart the first USB port.

2. The USB communication control module of claim 1 wherein:
the USB switch is in data communication with the first port power controller via a feedback bus;
the first port power controller provides feedback data that indicates whether abnormal power conditions exist for the associated USB device; and
when the feedback data indicates that abnormal power conditions exist, the USB switch facilitates temporary operation of the first port power controller in the power interrupt mode via the first control bus to restart the first USB port.

3. A USB communication control module comprising:
a first USB port that comprises an input power port and is configured for electrical coupling and data communication with an associated USB device;
a first port power controller in communication with the input power port of the first USB port, the first port power controller being operable in one of a power delivery mode and a power interrupt mode, wherein when in the power delivery mode, the first port power controller facilitates delivery of power from a power source to the input power port of the first USB port, and when in the power interrupt mode, the first port power controller facilitates the interruption of power from the power source to the input power port of the first USB port;
a USB switch in data communication with the first USB port via a first communication bus and in control communication with the first port power controller via a first control bus;
a microprocessor in data communication with the USB switch via a second communication bus; wherein:
data communicated between the microprocessor and a USB device is routed over the first communication bus, through the USB switch, over the second communication bus, and through the first USB port;
the USB switch monitors the first communication bus to determine whether communication between the first USB port and the associated USB device is lost;
when communication between the first USB port and the associated USB device is lost, the USB switch facilitates temporary operation of the first port power controller in the power interrupt mode via the first control bus to restart the first USB port;
the microprocessor is in control communication with the first port power controller via a second control bus;
the microprocessor monitors the second communication bus to determine whether communication between the first USB port and the associated USB device is lost; and
when communication between the first USB port and the associated USB device is lost, the microprocessor facilitates temporary operation of the first port power controller in the power interrupt mode via the second control bus to restart the first USB port.

4. A USB communication control module comprising:
a first USB port that comprises an input power port and is configured for electrical coupling and data communication with an associated USB device;
a first port power controller in communication with the input power port of the first USB port, the first port power controller being operable in one of a power delivery mode and a power interrupt mode, wherein when in the power delivery mode, the first port power controller facilitates delivery of power from a power source to the input power port of the first USB port, and when in the power interrupt mode, the first port power controller facilitates the interruption of power from the power source to the input power port of the first USB port;
a USB switch in data communication with the first USB port via a first communication bus and in control communication with the first port power controller via a first control bus;
a microprocessor in data communication with the USB switch via a second communication bus;
a second USB port that comprises an input power port and is configured for electrical coupling and data communication with an associated USB device; and
a second port power controller in communication with the input power port of the second USB port, the second port power controller being operable in one of a power delivery mode and a power interrupt mode, wherein when in the power delivery mode, the second port power controller facilitates delivery of power from a power source to the input power port of the second USB port, and when in the power interrupt mode, the second port power controller facilitates the interruption of power from the power source to the input power port of the second USB port; wherein:
data communicated between the microprocessor and a USB device is routed over the first communication bus, through the USB switch, over the second communication bus, and through the first USB port;
the USB switch monitors the first communication bus to determine whether communication between the first USB port and the associated USB device is lost;
when communication between the first USB port and the associated USB device is lost, the USB switch facilitates temporary operation of the first port power controller in the power interrupt mode via the first control bus to restart the first USB port;
the USB switch is in data communication with the second USB port via a third communication bus and in control communication with the second port power controller via a second control bus;
the microprocessor is in data communication with the second USB port via a fourth communication bus;
the USB switch monitors each of the first communication bus and the third communication bus to determine whether communication between any of the first USB port and the second USB port and their associated USB devices is lost; and
when communication between the second USB port and the associated USB device is lost, the USB switch facilitates temporary operation of the second port power controller in the power interrupt mode via the second control bus to restart the second USB port.

5. The USB communication control module of claim 4 wherein:
the microprocessor is in control communication with the second port power controller via a third control bus;
the microprocessor monitors each of the second communication bus and the fourth communication bus to determine whether communication between any of the first USB port and the second USB port and their associated USB devices is lost; and
when communication between the second USB port and the associated USB device is lost, the microprocessor facilitates temporary operation of the second port power controller in the power interrupt mode via the third control bus to restart the second USB port.

6. The USB communication control module of claim 4 wherein:
after restart of one of the first USB port and the second USB port, the USB switch monitors each of the first communication bus and the third communication bus to determine whether communication between the first USB port and the second USB port and their associated USB devices has been restored; and
when communication between the first USB port and the second USB port and their associated USB devices has not been fully restored, the microprocessor facilitates restarting of the USB switch.

7. The USB communication control module of claim 4 wherein:
after restart of the USB switch, the USB switch monitors each of the first communication bus and the third communication bus to determine whether communication between the first USB port and the second USB port and their associated USB devices has been restored; and
when communication between the first USB port and the second USB port and their associated USB devices has not been fully restored, the microprocessor facilitates transmission of an error message to a user.

8. A security system comprising:
a first associated USB device configured to selectively transmit a data message; and
a control unit comprising a USB communication control module comprising:
a first USB port comprising an input power port and being electrically coupled and in data communication with the first associated USB device;
a first port power controller in communication with the input power port of the first USB port, the first port power controller being operable in one of a power delivery mode and a power interrupt mode, wherein when in the power delivery mode, the first port power controller facilitates delivery of power from a power source to the input power port of the first USB port, and when in the power interrupt mode, the first port power controller facilitates the interruption of power from the power source to the input power port of the first USB port;
a USB switch in data communication with the first USB port via a first communication bus and in control communication with the first port power controller via a first control bus; and
a microprocessor in data communication with the first USB port via a second communication bus; wherein:
data communicated between the microprocessor and the first associated USB device is routed over the first communication bus, through the USB switch, over the second communication bus, and through the first USB port;
the USB switch monitors the first communication bus to determine whether communication between the first USB port and the first associated USB device is lost;
when communication between the first USB port and the first associated USB device is lost, the USB switch facilitates temporary operation of the first port power controller in the power interrupt mode via the first control bus to restart the first USB port; and
the USB switch monitors the delivery of power from the power source to the input power port of the first USB port, and, when abnormal power conditions exist, facilitates temporary operation of the first port power controller in the power interrupt mode to restart the first USB port.

9. The security system of claim 8 wherein:
the USB switch is in data communication with the first port power controller via a feedback bus;
the first port power controller provides feedback data that indicates whether abnormal power conditions exist for the associated USB device; and
when the feedback data indicates that abnormal power conditions exist, the USB switch facilitates temporary operation of the first port power controller in the power interrupt mode via the first control bus to restart the first USB port.

10. A security system comprising:
a first associated USB device configured to selectively transmit a data message; and
a control unit comprising a USB communication control module comprising:
a first USB port comprising an input power port and being electrically coupled and in data communication with the first associated USB device;
a first port power controller in communication with the input power port of the first USB port, the first port power controller being operable in one of a power delivery mode and a power interrupt mode, wherein when in the power delivery mode, the first port power controller facilitates delivery of power from a power source to the input power port of the first USB port, and when in the power interrupt mode, the first port power controller facilitates the interruption of power from the power source to the input power port of the first USB port;
a USB switch in data communication with the first USB port via a first communication bus and in control communication with the first port power controller via a first control bus;
a microprocessor in data communication with the first USB port via a second communication bus; wherein:
data communicated between the microprocessor and the first associated USB device is routed over the first communication bus, through the USB switch, over the second communication bus, and through the first USB port;
the USB switch monitors the first communication bus to determine whether communication between the first USB port and the first associated USB device is lost;
when communication between the first USB port and the first associated USB device is lost, the USB switch facilitates temporary operation of the first port power controller in the power interrupt mode via the first control bus to restart the first USB port;
the microprocessor is in control communication with the first port power controller via a second control bus;
the microprocessor monitors the second communication bus to determine whether communication between the first USB port and the first associated USB device is lost; and
when communication between the first USB port and the first associated USB device is lost, the microprocessor facilitates temporary operation of the first port power controller in the power interrupt mode via the second control bus to restart the first USB port.

11. The security system of claim 10 further comprising:
a second USB port that comprises an input power port and is configured for electrical coupling and data communication with a second associated USB device; and
a second port power controller in communication with the input power port of the second USB port, the second port power controller being operable in one of a power delivery mode and a power interrupt mode, wherein when in the power delivery mode, the second port power controller facilitates delivery of power from a power source to the input power port of the second USB port, and when in the power interrupt mode, the second port power controller facilitates the interruption of power from the power source to the input power port of the second USB port; wherein:
the USB switch is in data communication with the second USB port via a third communication bus and in control communication with the second port power controller via a second control bus;
the microprocessor is in data communication with the second USB port via a fourth communication bus;
the USB switch monitors each of the first communication bus and the third communication bus to determine whether communication between the first and second USB ports and the respective first and second associated USB devices is lost; and
when communication between the second USB port and the second associated USB device is lost, the USB switch facilitates temporary operation of the second port power controller in the power interrupt mode via the second control bus to restart the second USB port.

12. The security system of claim 11 wherein:
the microprocessor is in control communication with the second port power controller via a third control bus;
the microprocessor monitors each of the second communication bus and the fourth communication bus to determine whether communication between the first and second USB ports and the respective first and second associated USB devices is lost; and
when communication between the second USB port and the second associated USB device is lost, the microprocessor facilitates temporary operation of the second port power controller in the power interrupt mode via the third control bus to restart the second USB port.

13. The security system of claim 11 wherein:
after restart of one of the first USB port and the second USB port, the USB switch monitors each of the first communication bus and the third communication bus to determine whether communication between the first and second USB ports and the respective first and second associated USB devices has been restored; and
when communication between the first and second USB ports and the respective first and second associated USB devices has not been fully restored, the microprocessor facilitates restarting of the USB switch.

14. The security system of claim 13 wherein:
after restart of the USB switch, the USB switch monitors each of the first communication bus and the third communication bus to determine whether communication between the first and second USB ports and the respective first and second associated USB devices has been restored; and
when communication between the communication between the first and second USB ports and the respective first and second associated USB devices has not been fully restored, the microprocessor facilitates transmission of an error message to a user.

15. A method of operating a USB communication control module comprising a USB switch in data communication with a USB port, and a port power controller in electrical communication with the USB port, the method comprising:
operating, by the USB switch, the port power controller in a power delivery mode to facilitate delivery of power from a power source to the USB;
monitoring, by the USB switch, data communication between the USB port and an associated USB device that is electrically coupled and in communication with the USB port;
when data communication between the USB port and the associated USB device is lost, temporarily operating, by the USB switch, the port power controller in a power interrupt mode to facilitate interruption of power from a power source to the USB port to restart the USB port;
after restarting the USB port, monitoring data communication between the USB port and the associated USB device again to determine whether communication between the USB port and the associated USB device has been restored; and
when communication between the USB port and the associated USB devices has not been restored, restarting the USB switch.

16. The method of claim 15 further comprising:
after restarting the USB switch, monitoring data communication between the USB port and the associated USB device again to determine whether communication between the USB port and the associated USB device has been restored; and
when communication between the USB port and the associated USB devices has not been restored, transmitting an error message to a user.

17. A method of operating a USB communication control module comprising a USB switch in data communication with a USB port, and a port power controller in electrical communication with the USB port, the method comprising:
operating, by the USB switch, the port power controller in a power delivery mode to facilitate delivery of power from a power source to the USB;
monitoring, by the USB switch, data communication between the USB port and an associated USB device that is electrically coupled and in communication with the USB port; and
when data communication between the USB port and the associated USB device is lost, temporarily operating, by the USB switch, the port power controller in a power interrupt mode to facilitate interruption of power from a power source to the USB port to restart the USB port;
wherein the associated USB device comprises a detection device for a security system that is configured to selectively transmit, as a data message, an alarm signal to the USB switch in response to an alarm condition.

* * * * *

UNITED STATES PATENT AND TRADEMARK OFFICE
CERTIFICATE OF CORRECTION

PATENT NO. : 10,248,597 B2
APPLICATION NO. : 15/337351
DATED : April 2, 2019
INVENTOR(S) : Steven P. Verdino et al.

Page 1 of 1

It is certified that error appears in the above-identified patent and that said Letters Patent is hereby corrected as shown below:

In the Claims

Claim 14, Column 17, Lines 55-56, change "when communication between the communication between the first and second" to --when communication between the first and second--.

Signed and Sealed this
Fourteenth Day of May, 2019

Andrei Iancu
*Director of the United States Patent and Trademark Office*